(12) United States Patent
Funamoto (10) Patent No.: US 9,106,830 B2
(45) Date of Patent: Aug. 11, 2015

(54) IMAGE CAPTURE APPARATUS AND METHOD FOR TRACKING A SUBJECT

(71) Applicant: CANON KABUSHIKI KAISHA, Tokyo (JP)

(72) Inventor: Shohei Funamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/804,677

(22) Filed: Mar. 14, 2013

(65) Prior Publication Data

US 2013/0265482 A1 Oct. 10, 2013

(30) Foreign Application Priority Data

Apr. 10, 2012 (JP) ................. 2012-089675

(51) Int. Cl.
*H04N 5/232* (2006.01)
*H04N 5/235* (2006.01)

(52) U.S. Cl.
CPC ........... *H04N 5/23219* (2013.01); *H04N 5/235* (2013.01); *H04N 5/23212* (2013.01); *H04N 5/23245* (2013.01)

(58) Field of Classification Search
None
See application file for complete search history.

(56) References Cited

U.S. PATENT DOCUMENTS

| 6,639,998 | B1 * | 10/2003 | Lee et al. ....................... 382/103 |
| 2009/0322894 | A1 * | 12/2009 | Abe ........................... 348/222.1 |
| 2010/0033579 | A1 * | 2/2010 | Yokohata et al. .............. 348/169 |
| 2010/0053358 | A1 * | 3/2010 | Kodama ..................... 348/222.1 |
| 2010/0053419 | A1 * | 3/2010 | Fukui ............................ 348/352 |
| 2010/0066843 | A1 * | 3/2010 | Muramatsu .............. 348/208.14 |
| 2010/0208127 | A1 * | 8/2010 | Takada et al. ................. 348/349 |

FOREIGN PATENT DOCUMENTS

| JP | 2009-124565 A | 6/2009 |
| JP | 2011-027847 A | 2/2011 |

* cited by examiner

*Primary Examiner* — Justin P Misleh
(74) *Attorney, Agent, or Firm* — Carter, DeLuca, Farrell & Schmidt, LLP (57) ABSTRACT

Disclosed is an image capture apparatus that has a subject tracking functionality of sequentially detecting a predetermined subject in images that are continuously shot, and a method for controlling the same. During tracking of the subject, degrees of reliability of tracking are determined. When the detected face is set as a template image, the template image is not changed until it is determined a predetermined plurality of times in succession that the degrees of reliability of tracking are low. It is thus possible to achieve a subject tracking functionality that is hardly affected by false detections.

10 Claims, 8 Drawing Sheets

IMAGE CAPTURE APPARATUS AND METHOD FOR TRACKING A SUBJECT

BACKGROUND OF THE INVENTION

1. Field of the Invention

The present invention relates to an image capture apparatus and a method for controlling the same, in particular, to an image capture apparatus that has a functionality to track a subject, and a method for controlling the same.

2. Description of the Related Art

Conventionally, in cameras with a solid-state image sensor, a functionality to detect a given subject from a frame of a moving image, such as a live view image, and to track the subject in a subsequent frame has been put to practical use. Cameras having such a subject tracking functionality can detect the location of the subject in the image so as to appropriately perform an automatic focus adjustment and an automatic exposure control on the subject. For example, a camera has been commercialized that detects a human face and sets it as a tracking target, thereby continuously focusing on the detected face. Further, there are also cameras that reset a tracking target, if they have lost a subject during tracking of the subject, and start the tracking again.

For example, Patent Document 1 (Japanese Patent Laid-Open No. 2011-27847) discloses a camera that, if it has detected human faces in an image, automatically selects the largest face of the detected human faces as a tracking target.

Further, Patent Document 2 (Japanese Patent Laid-Open No. 2009-124565) discloses a camera that performs a face detection operation, then sets a tracking target, and starts a tracking operation, the camera having a functionality to perform a face detection operation again, and to reset a tracking target, if it has lost the tracking target.

Both Patent Documents 1 and 2 teach that, if no face is detected, the previously-set subject in an automatic focus detection area is set as the tracking target.

However, in the conventional technologies disclosed in Patent Documents 1 and 2, no countermeasure against false face detection is proposed, so that a falsely detected area may be taken as a face detection area to be tracked.

SUMMARY OF THE INVENTION

The present invention has been accomplished in view of such a problem of the conventional technologies. The present invention provides a subject tracking function that is based on subject detection and having improved tolerance or robustness to false detection of a subject.

According to an aspect of the present invention, there is provided an image capture apparatus comprising: a face detection unit configured to detect a face that is included in an image; a subject detecting unit configured to detect, from an image obtained by shooting, a area that is similar to a template image; and a control unit configured to achieve a functionality of tracking a subject by making the subject detecting unit sequentially detect a area similar to a template image of the subject area in images that are continuously shot; wherein the control unit is further configured to determine, during tracking of the subject, reliability of the detection by the subject detecting unit and, when the face detected by the face detection unit is set as the template image, not to change the template image until it is determined a predetermined plurality of times in succession that reliability of the detection by the subject detecting unit is low.

According to another aspect of the present invention, there is provided a method for controlling an image capture apparatus, the image capture apparatus comprising: a face detection unit configured to detect a face that is included in an image; and a subject detecting unit configured to detect, from an image obtained by shooting, a area that is similar to a template image, the method comprising: a controlling step of achieving a functionality of tracking a subject by making the subject detecting unit sequentially detect a area similar to a template image of the subject area in images that are continuously shot, in the controlling step, during tracking of the subject, reliability of the detection by the subject detecting unit being determined, and when the face detected by the face detection unit is set as the template image, the template image being not changed until it is determined a predetermined plurality of times in succession that reliability of the detection by the subject detecting unit is low.

Further features of the present invention will become apparent from the following description of exemplary embodiments with reference to the attached drawings.

DESCRIPTION OF THE EMBODIMENTS

An exemplary embodiment of the present invention will now be described in detail in accordance with the accompanying drawings.

Figure 2:
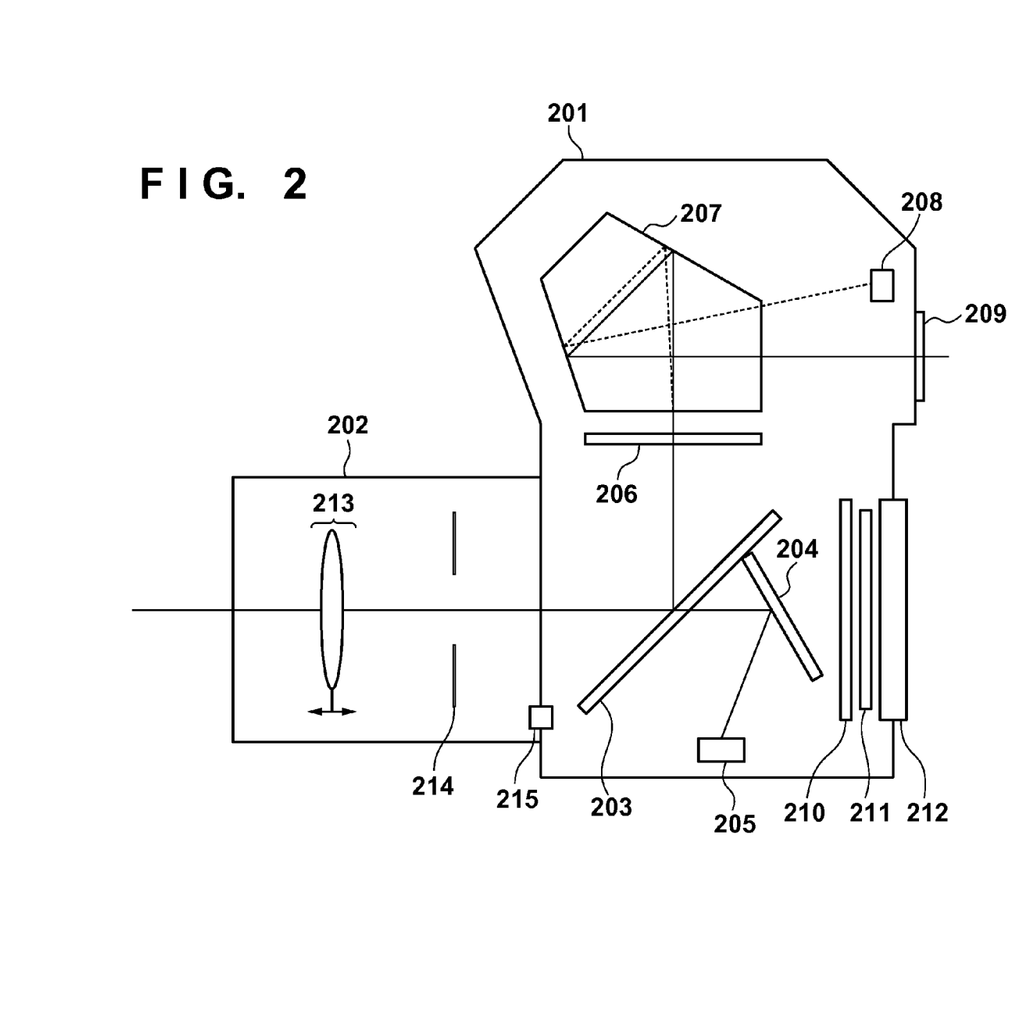
FIG. 2 is a sectional side view illustrating a digital single-lens reflex camera as an example of the image capture apparatus according to the embodiment of the present invention.

FIG. 2 is a sectional side view illustrating an example of an arrangement of main constituent components of a digital single-lens reflex camera (DSLR) as an example of an image capture apparatus according to an embodiment of the present invention. The DSLR includes a main body 201 and an imaging lens 202 that is attached to the front of the main body 201. The imaging lens 202 is exchangeable, and the main body 201 and the imaging lens 202 are connected to each other mechanically and electrically via a lens mount (not shown). The imaging lens 202 includes a focusing lens 213 and a diaphragm 214, which are operated by electrical control of the main body 201 via a group of lens mount contacts 215.

A main mirror 203 is a half mirror, and a sub mirror 204 is provided behind the main mirror 203. In the illustrated state in which the mirror is not raised, the main mirror 203 reflects part of a bundle of light from the imaging lens 202 so that it is incident on a finder optical system provided above, and the sub mirror 204 reflects transmitted light of the bundle of light so that it is incident on an AF device 205 provided below. In the state in which the mirror is raised, for example, at the time of exposure, both mirrors retract from the optical path.

The AF device 205 is an AF sensor of a phase-difference detection type. By imaging a secondary imaging surface of the imaging lens 202 on a focus detection line sensor included in the AF device 205, an amount of defocusing and a focus direction of the imaging lens 202 are detected, and the focusing lens 213 is driven on the basis of the detection results, thereby performing an automatic focus adjustment. Since phase-difference detection type focus control is well-known and not directly related to the present invention, descriptions of a detailed configuration of the AF device 205 and the focus control are omitted.

A focusing screen 206 is a transmissive type liquid crystal display that is arranged on an imaging surface of the imaging lens 202 on which images are to be formed when the imaging lens 202 serves as a finder optical system, and displays, in a superimposed manner, information relating to a focus area and the like on an optical image having a field of view formed by the imaging lens 202. By observing the focusing screen 206 from an eye piece 209 via a pentaprism 207 for changing a finder optical path, a user can confirm the field of view of an image to be captured, a focus area, and the like.

An AE device 208 changes an optical finder image into photometric image data using an AE sensor that has a plurality of pixels, in order to observe the brightness of the subject. The AE sensor may have the same configuration as that of an image sensor 211, except in the number of pixels, but it is referred to as an "AE sensor" because it is used mainly for detecting a brightness of the subject. The photometric image data has R, G, and B components. The AE device 208 performs, using the generated photometric image data, brightness detection, exposure control, tracking, and face detection of the subject.

The image sensor 211 is a CMOS image sensor, a CCD image sensor, or the like, in which a plurality of pixels each including a photoelectric conversion element are arranged. By retracting the main mirror 203 and the sub mirror 204 from the shooting optical path, and by opening a curtain shutter 210, the image sensor 211 is exposed and an optical image of the subject is shot.

A display 212 is, for example, a liquid crystal display (LCD), used as an electronic view finder while displaying live view images, and used for displaying various types of setting values, shooting information, apparatus information, GUI screens, captured images, and the like.

Figure 3:
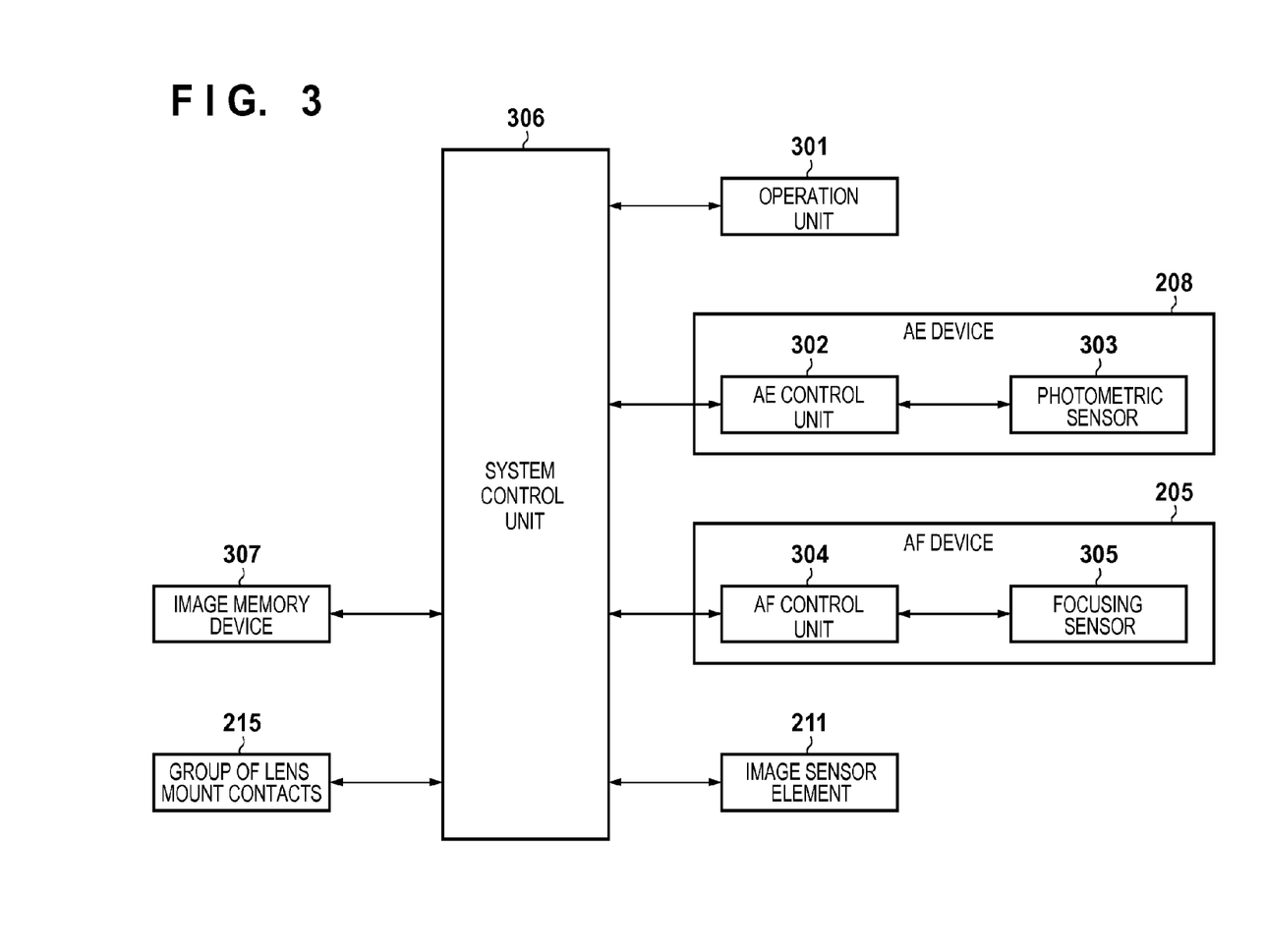
FIG. 3 is a block diagram illustrating an example of a configuration of a functionality of the digital single-lens reflex camera according to the embodiment of the present invention.

FIG. 3 is a block diagram illustrating an example of a functional configuration of a DSLR of the present embodiment. Note that the same reference numerals are given to the same constituent elements as those in FIG. 2.

An operation unit 301 detects operation performed by the user via a button, a switch, a dial, a connection equipment, and the like that are mounted on the main body 201 and/or the imaging lens 202, and outputs a signal that corresponds to the content of the operation to the system control unit 306. The operation unit 301 sends signals SW1 and SW2 according to a push amount of a release button. Specifically, the operation unit 301 outputs the signal SW1 to the system control unit 306 when the release button is pushed approximately half way down, and outputs the signal SW2 to the system control unit 306 when the release button is further pushed to the predetermined extent. Note that the state of the release button being pushed so that the signal SW1 is output is referred to as a "half way down push", and the state of the release button being pushed so that the signal SW2 is output is referred to as a "all the way down push". The state in which the "half way down push" of the release button is held is referred to as "SW1 holding state", and the state in which the "all the way down push" of the release button is held is referred to as "SW2 holding state". Also, the operation unit 301 outputs an SW1 cancellation signal to the system control unit 306 when a push amount of the release button has fallen below the push amount for sending the signal SW1, and outputs an SW2 cancellation signal to the system control unit 306 when the push amount of the release button has fallen below the push amount for sending the signal SW2.

Figure 6A:
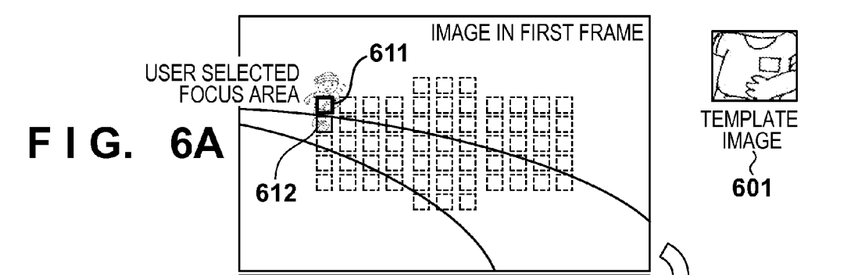
FIGS. 6A to 6D are diagrams illustrating examples of optical finder images of the image capture apparatus according to the embodiment of the present invention that is tracking the subject.

As described above, the AF device 205 performs automatic focus detection of the phase-difference detection type and drives the focusing lens 213 to a focus position (automatic focus adjustment) based on the results of the automatic focus detection. The AF device 205 is constituted by an AF control unit 304 and a focusing sensor 305. The focusing sensor 305, which is configured by a line sensor that corresponds to, for example, an arrangement of 61 focus areas as illustrated in FIG. 6A, converts into electric signals the light that is incident thereon via the sub mirror 204, and outputs a pair of image signals for each focus area to the AF control unit 304. The AF control unit 304 calculates, on the basis of a phase difference between the pair of image signals that were output from the focusing sensor 305, an amount of defocusing for each focus area illustrated in FIG. 6A, and selects one focus area to be focused. Then, the AF control unit 304 outputs to the system control unit 306 a defocus map that has an amount of defocusing for each focus area as data, and location information of the selected focus area. The system control unit 306 performs focus adjustment operation on the basis of the location of the selected focus area and the defocus map, and controls the location of the focusing lens 213 so that it focuses on the selected focus area.

The AE device 208 performs the automatic exposure control and the subject tracking. The AE device 208 is constituted by the AE control unit 302 and the photometric sensor 303. The AE control unit 302 performs the automatic exposure control on the basis of the photometric image data that were sequentially read out from the photometric sensor 303, and outputs the result thereof to the system control unit 306. The system control unit 306 controls, on the basis of the result of the automatic exposure control that was output from the AE control unit 302, the F-number of the diaphragm 214 (aperture size) so as to adjust an amount of light that is to be incident on the main body 201.

Furthermore, in the SW1 holding state and during continuous shooting, the AE control unit 302 sequentially detects the subject using the photometric image data that were continuously shot by the photometric sensor 303, thereby achieving the subject tracking and outputting information on the location of the detected subject to the system control unit 306. The system control unit 306 outputs to the AF control unit 304 the location information of the subject that was output by the AE control unit 302.

The AF control unit 304 calculates an amount of defocusing in a focus area at the location of the subject or near that location that was output by the system control unit 306, and compares the calculation results with a predetermined threshold. If the result of the comparison shows that the amount of defocusing is not greater than the threshold, the AF control unit 304 updates the location data on the selected focus area that will be output to the system control unit 306 from the focus area that was selected by the AF control unit 304 on the basis of the amount of defocusing for each focus area to a focus area that is located on the subject or near the subject.

When the signal SW2 is output from the operation unit 301, the system control unit 306 raises the main mirror 203 (and the sub mirror 204), and retracts it (them) from the optical path. Then, the system control unit 306 drives the curtain shutter 210, and exposes the image sensor 211 for a time period according to the result of the automatic exposure control. When the exposure time ends, the system control unit 306 lowers the main mirror 203 (and the sub mirror 204).

The image sensor 211 converts the light that is incident thereon via the imaging lens 202 during the exposure time into an electric signal for each pixel so as to generate image data, and outputs the image data to the system control unit 306. The system control unit 306 subjects the image data that was output from the image sensor 211 to predetermined image processing or the like, and displays the image data on the display 212 or writes the image data into the image memory device 307.

Hereinafter, operation of the DSLR of the present embodiment will be described.

Figure 4:
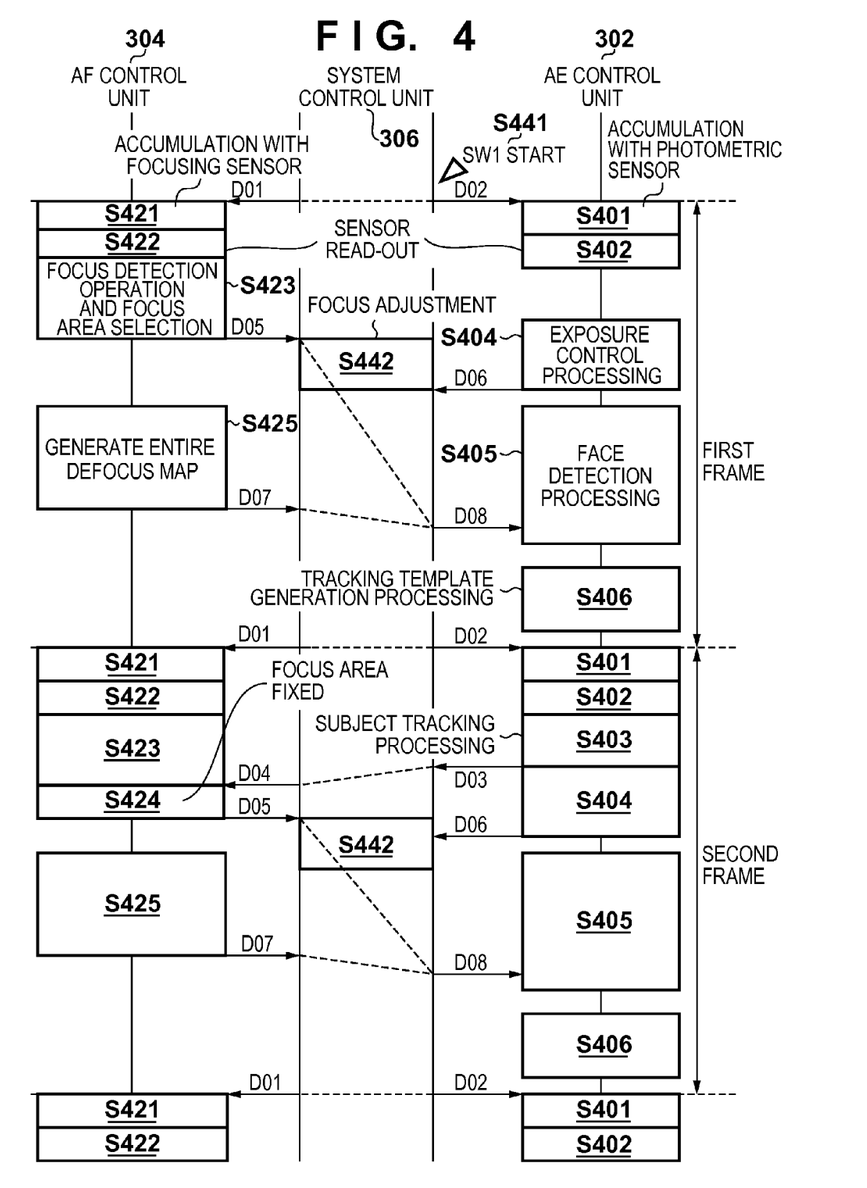
FIG. 4 is a diagram illustrating processing sequence of an AF control unit, a system control unit, and an AE control unit of FIG. 2, and a mutual relationship among them.
Figure 5:
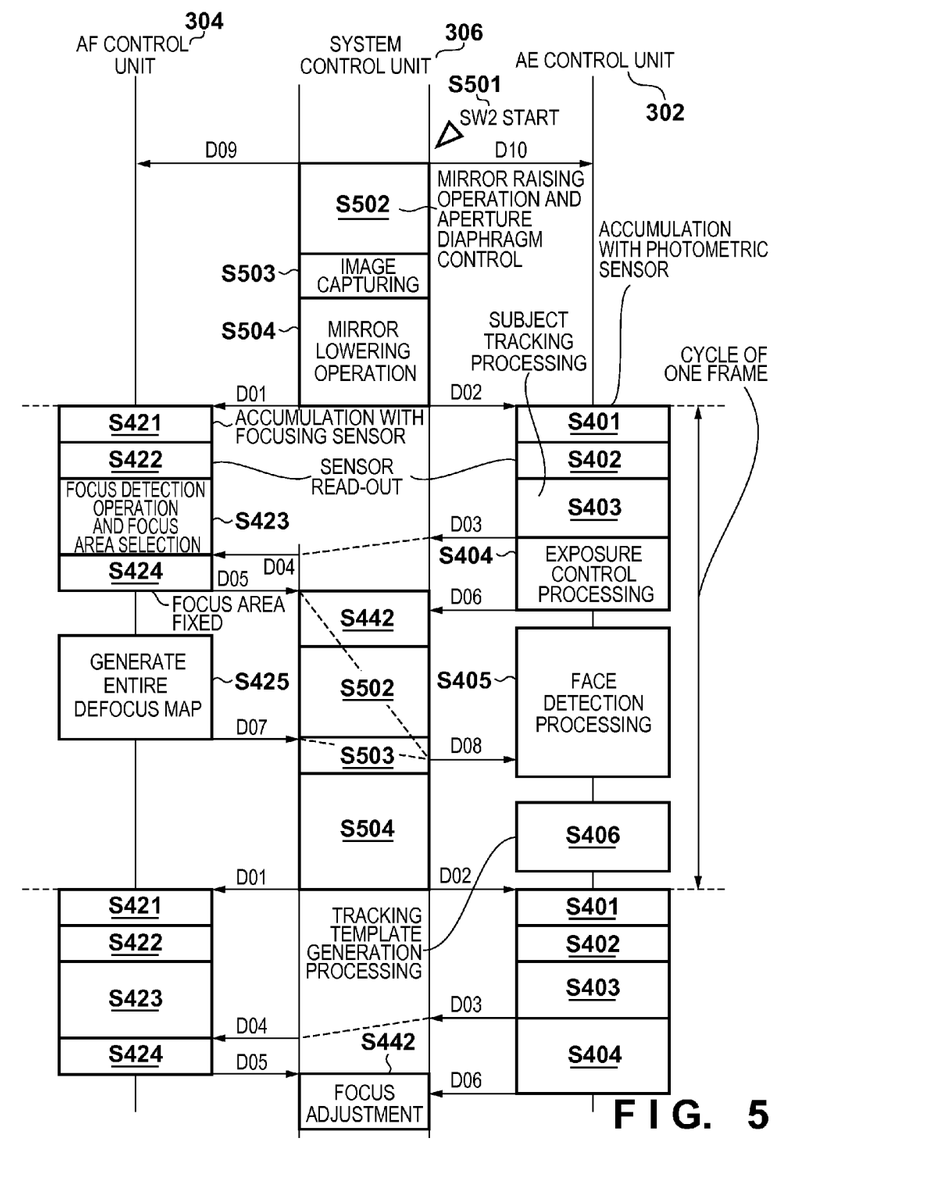
FIG. 5 is a diagram illustrating a processing sequence of an AF control unit, a system control unit, and an AE control unit of FIG. 2, and a mutual relationship among them.

FIGS. 4 and 5 are diagrams illustrating an operation sequence of the AF control unit 304, the system control unit 306, and the AE control unit 302, specifically FIG. 4 illustrates an operation sequence in the SW1 holding state, and FIG. 5 illustrates an operation sequence in the SW2 holding state. Note that FIGS. 4 and 5 are intended to illustrate the processing sequence and operation timing in each control unit, so that the size (height) of a block is not associated with the length of processing time even if the processing is performed by the same control unit, let alone by different control units.

Step S441 indicates the timing at which the release button is pushed half way down and the signal SW1 is output from the operation unit 301 to the system control unit 306. The system control unit 306 that has received the input of the signal SW1, outputs an AF start signal D01 to the AF control unit 304, and an AE start signal D02 to the AE control unit 302.

In the SW1 holding state, the AE control unit 302 repeatedly performs the processing from step S401 to step S406 as a single processing unit with respect to an image in one moving image frame (still image frame) (hereinafter moving image frame and still image frame being referred to as merely "frame"). Similarly, the AF control unit 304 performs the processing from step S421 to step S425 as a single processing unit with respect to an image in one frame. However, both the AE control unit 302 and the AF control unit 304 start one processing unit in response to reception of the start signals (the AF start signal and the AE start signal) that were output from the system control unit 306. Further, subject tracking processing (S403) and focus area re-selection processing (S424), which are included in the single processing unit, are not performed in the first frame since the AE control unit 302 and the AF control unit 304 start the processing, but from the second frame onward. This is because no tracking target has yet been decided in the first frame.

Now, the processing from step S401 to step S406 that is performed in the AE control unit 302 is explained.

In step S401, when receiving the AE start signal D02 from the system control unit 306, the AE control unit 302 performs accumulation with the photometric sensor 303 (shooting by the photometric sensor 303). This accumulation (shooting) operation is started simultaneously with the accumulation operation of the focusing sensor 305 performed by the AF control unit 304 that has received the AF start signal D01 from the system control unit 306. Accordingly, the image signals that are obtained by the focusing sensor 305 and the photometric sensor 303 are signals that are shot at the same timing.

In step S402, the AE control unit 302 reads out the photometric image data from the photometric sensor 303, and generates detection target image data having RGB color information.

In step S403, the AE control unit 302 performs the subject tracking processing for detecting the location of the tracking target (coordinates of the subject) in the detection target image. Specifically, the AE control unit 302 takes a template image that was generated in the previously performed tracking template generation processing (S406) as a tracking target image, and performs template matching on the detection target image that was generated in step S402. "Template matching" refers to a method for detecting an image area that is included in the detection target image and is identical or similar to the template image, the detection being performed by evaluating the correlation therebetween on the basis of brightness information and color information of the images.

Further, the AE control unit 302 calculates degrees of reliability of tracking on the basis of how much the template image, and an image in the area detected as the tracking target that is included in the detection target image are correlated. The higher they are correlated, the higher the degree of reliability that is calculated. Then, the AE control unit 302 outputs the subject tracking processing results, as data D03, which includes the location of the tracking target and the degree of reliability of tracking, to the system control unit 306. This data is transferred, as data D04, to the AF control unit 304 by the system control unit 306.

In step S404, the AE control unit 302 performs exposure control based on the detection target image that was generated in step S402, and outputs the exposure control results, as exposure control data D06, to the system control unit 306. At that time, if a face was detected in the face detection processing (S405) performed with respect to the image in one frame before, the AE control unit 302 corrects the exposure control results so that the face can be shot with correct exposure, on the basis of the brightness information of the detected face area in the same detection target image of one frame before. In the present embodiment, up to five focus areas that are close to the selected focus area are selected in the detected face and a brightness value (BV value) of the subject for deciding a shooting condition is calculated from the average value of brightnesses in the face area.

In step S405, the AE control unit 302 subjects the image data that was read out in step S402 to face detection processing, and outputs a detected face location (representative coordinates in the face area). If a plurality of faces were detected, the face that is located closest to the selected focus area is selected on the basis of data on the selected focus area D08 that will be described later and on the detected locations of the face, and the face is taken as a candidate for a tracking target.

In step S406, the AE control unit 302 generates or updates the tracking template on the basis of the data on the selected focus area D08 that will be described later and on the results of the face detection processing in step S405. The detail of the processing will be explained later.

The foregoing is the processing of the AE control unit 302. However, as described above, no subject tracking processing in step S403 is performed if no tracking template was generated (for example, in the first frame).

The processing from step S421 to step S425 that is performed by the AF control unit 304 is explained in the following.

In step S421, when receiving the AF start signal D01 that was output from the system control unit 306, the AF control unit 304 starts the charge accumulation (shooting) using the focusing sensor 305.

In step S422, the AF control unit 304 reads out the image signal from the focusing sensor 305.

In step S423, the AF control unit 304 performs the focus detection operation based on the image signal that was read out in step S422, and calculates a focus condition (an amount of defocusing) in the focus area. Note that, in the first frame after the output of the signal SW1, focus detection is performed in the focus area selected in advance by the user settings or the like, but in the second frame or later, focus detection is performed in the focus area selected in the one frame before and the focus areas close to that frame.

In step S424, the AF control unit 304 receives from the system control unit 306 the data D04, which is the result of the subject detection processing performed by the AE control unit in step S403 and relates to the location of the tracking target and degree of reliability of tracking. Then, on the basis of the location of the tracking target and the degree of reliability of tracking, the AF control unit 304 re-selects a focus area. Namely, the AF control unit 304 calculates amounts of defocusing in five focus areas in total among the selectable focus areas, the five focus areas including a focus area that is closest to the location of the tracking target (the detected location of the subject), and other focus areas in upward, downward, leftward, and rightward surrounding focus area. If the calculated minimum amount of defocusing is not greater than a predetermined value, the AF control unit 304 takes the focus area having the calculated minimum amount of defocusing as a newly selected focus area, instead of the focus area selected in step S423.

On the other hand, if all the amounts of defocusing in the five focus areas are greater than the predetermined value, the AF control unit 304 does not change the focus area selected in step S423. In this way, by taking as candidates for re-selection not only the focus area that is closest to the location of the tracking target but also the surrounding focus areas, it is possible to perform focus detection of a main subject, even if the contrast of the focus area closest to the location of the tracking target thereto is so low that an amount of defocusing cannot be calculated.

If the selected focus area is decided, the AF control unit 304 outputs, to the system control unit 306, data D05, which includes information on the amount of defocusing corresponding to the location of the selected focus area. With this measure, focus adjustment by the system control unit starts (S442).

In step S425, the AF control unit 304 calculates focus conditions (amounts of defocusing) for all focus areas that are selectable, so as to update the defocus map, and outputs the updated defocus map, as data D07, to the system control unit 306.

The system control unit 306 outputs, as data D08, the location of the selected focus area that was received as the data D05, and the defocus map that was received as the data D07 to the AE control unit 302. Note that "location of the selected focus area" may refer to information indicating the specific location of the focus area, but information that can specify the focus area, such as focus area number, is also applicable when information on the location of each focus area is separately available.

Since the calculation of amounts of defocusing for all focus areas requires time, the response may deteriorate if the focus adjustment processing performed by the system control unit 306 in step S442 is performed after the defocus map is updated. Therefore, deterioration in response of the focus adjustment is prevented by first outputting, to the system control unit 306 in step S423, information needed for adjusting focus on the selected focus area so that the focus adjustment processing is performed, and then newly supplying a defocus map to the system control unit 306.

The foregoing is the processing of the AF control unit 304. Since, however in the first frame, the AE control unit 302 skips the subject tracking processing in step S403 and does not output the data D04 relating to the location of the tracking target, the AF control unit 304 skips the focus area re-selection processing in step S424. Here, the AF control unit 304 sets the focus area that was selected in the focus detection operation and the focus area selecting processing in step S423 as the selected focus area, and outputs it, as the data D05, to the system control unit 306.

Lastly, the processing of the system control unit 306 is explained.

In step S442, the system control unit 306 drives the focusing lens 213 on the basis of the information relating to the location of the selected focus area and the amount of defocusing that are received from the AF control unit 304 as the data D05, and performs the focus adjustment such that the focusing lens 213 focuses on the selected focus area.

Further, the system control unit 306 synchronizes timings to start the operations of the AE control unit 302 and the AF control unit 304, and transfers data between the AE control unit 302 and the AF control unit 304.

The details of this operation of the system control unit 306 are as follows.

In order to synchronize the accumulation operations of the photometric sensor 303 and the focusing sensor 305, the system control unit 306 outputs the AF start signal D01 and the AE start signal D02 for the processing simultaneously.

The system control unit 306 receives from the AE control unit 302 the data D03, which relates to the location of the tracking target and the degree of reliability of tracking, and outputs it, as the data D04, which relates to the location of the tracking target, to the AF control unit 304 at a predetermined timing.

The system control unit 306 receives, from the AF control unit 304, the data D05, which relates to the information on the location of the selected focus area, and the data D07, which relates to the defocus maps of all the focus areas, and outputs them, as the data D08, at the predetermined timing to the AE control unit 302.

FIG. 5 is a diagram illustrating processing sequence of the AF control unit 304, the system control unit 306, and the AE control unit 302 when performing continuous shooting (sequential shooting) after the release button is pushed all the way down and the signal SW2 is output.

Similar to FIG. 4, FIG. 5 is also intended to illustrate the processing sequence and the operation timing in each control unit, so that the size (height) of a block is not associated with the length of processing time even if the processing are performed by the same control unit, let alone by different control units. Further, in FIG. 5, the processing to which the same numbers are added as those in FIG. 4 are the same as the processing explained in FIG. 4, and duplicate explanations are omitted.

In step S501, when detecting the output of the signal SW2 from the operation unit 301, the system control unit 306 starts a series of operations of a mirror raising operation (S502), a main shooting operation (S503), and a mirror lowering operation (S504). Each operation is explained in detail later.

Further, the system control unit 306 outputs a release start signal D09 to the AF control unit 304 and a release start signal D10 to the AE control unit 302. The AF control unit 304 and the AE control unit 302 that have received the release start signals D09 and D10 interrupt the processing that they are carrying out at that time. After completing the mirror lowering operation in step S504, the system control unit outputs the AF start signal D01 to the AF control unit 304, and the AE start signal D02 to the AE control unit 302.

The AF control unit 304 that has received the AF start signal D01 performs the processing from step S421 to step S425, and the AE control unit 302 that received the AE start signal D02 performs the processing from step S401 to step S406. During the SW2 holding state, the system control unit 306 outputs the AF start signal D01 to the AF control unit 304 and the AE start signal D02 to the AE control unit 302 at a timing at which the mirror lowering operation in step S504 for each frame is completed.

In the following, the processing from steps S502 to S504 is explained in detail.

In step S502, the system control unit 306 raises the main mirror 203 and the sub mirror 204, so that they retract from the optical path. Also, the system control unit 306 drives the diaphragm 214 on the basis of the exposure control result received as the data D06 directly from the AE control unit 302, and controls an aperture of the diaphragm.

In step S503, the system control unit 306 drives the curtain shutter 210 on the basis of the exposure control results, and exposes the image sensor 211 for a time period according to the exposure control results.

In step S504, the system control unit 306 lowers the main mirror 203 and the sub mirror 204.

The image sensor 211 accumulates electric charge that is generated by light incident on each pixel via the imaging lens 202 during the exposure time, and converts the electric charge into electric signals so as to generate image data, outputting them to the system control unit 306. The system control unit 306 subjects the image data that was output from the image sensor 211 to predetermined image processing and the like, and the image data is displayed on the display 212 or written into the image memory device 307.

As long as the SW2 state is maintained, the system control unit 306 repeats the processing from step S442 to step S504 as one processing unit, thus achieving continuous shooting.

Figure 7:
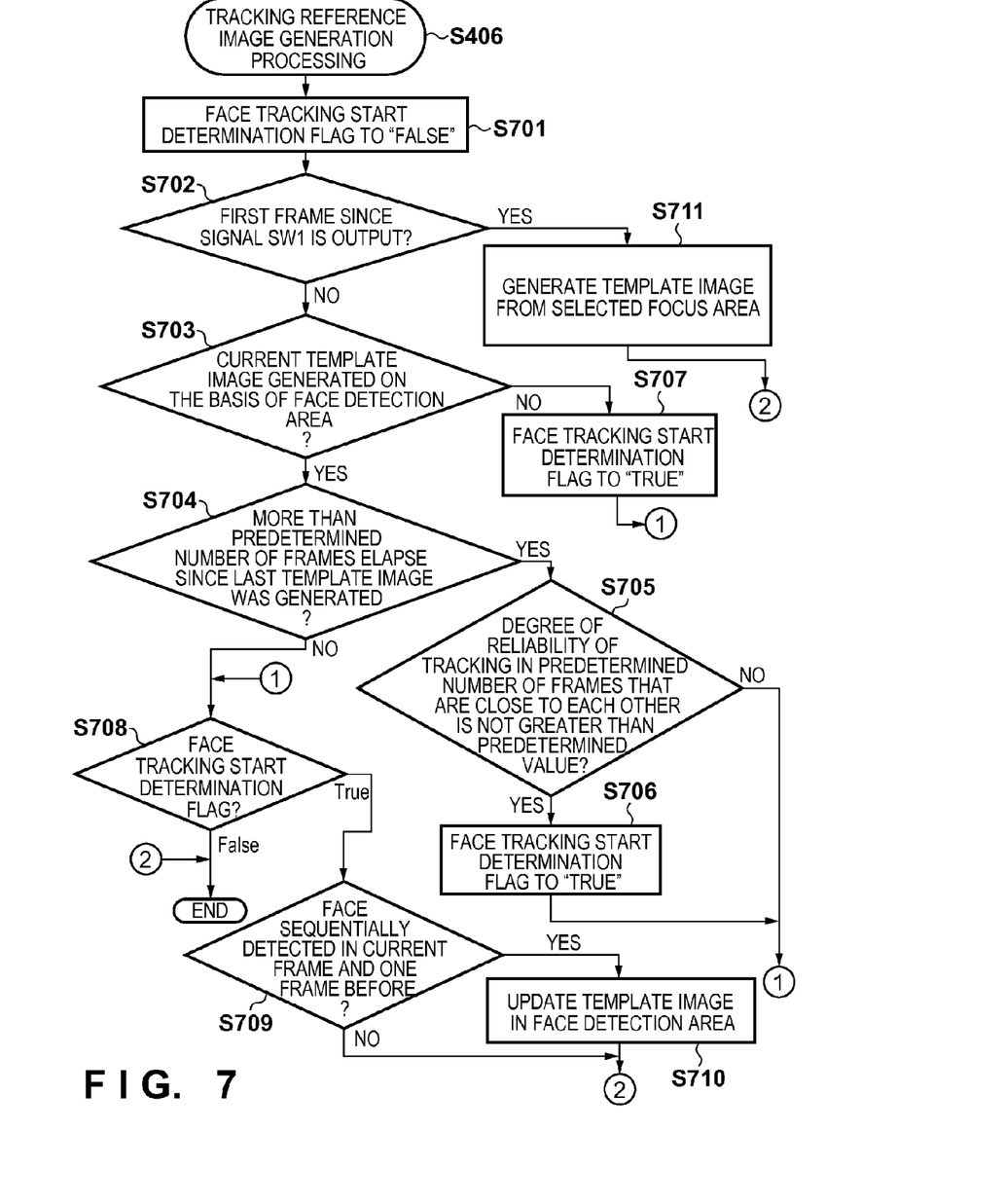
FIG. 7 is a flowchart illustrating template image generation processing of the image capture apparatus according to the embodiment of the present invention.

Next, the operation sequence of the tracking template generation processing performed by the AE control unit 302 in step S406 is explained with reference to the flowchart illustrated in FIG. 7.

In step S701, the AE control unit 302 sets a face tracking start determination flag to "False". This flag is used in step S708 for determination of whether or not to update the template image.

In step S702, the AE control unit 302 determines whether or not the current frame is the first frame since starting to output the signal SW1. If it is the first frame, the template image was not generated and thus the AE control unit 302 extracts, in step S711, the selected focus area of the photometric image as a template image, and ends the tracking template generation processing.

On the other hand, if it is determined in step S702 that the current frame is the second frame or later, then the AE control unit 302 determines, in step S703, whether or not the current template image is generated on the basis of the face detection area. If the template image is not generated based on the face detection area, then the AE control unit 302 sets, in step S707, the face tracking start determination flag to "True", and advances the processing to step S708. If the template image is generated based on the face detection area, then the AE control unit 302 advances the processing to step S704.

This measure is to prevent updating of a template image even if the template image is generated based on the face detection area (that is, when the template image is a face) and a new face is detected during the tracking processing. This prevents the face of the detection target from being changed on the way.

In step S704, the AE control unit 302 determines whether or not the lapsed time since the last template image was generated is longer than or equal to a predetermined time period. Although, here, the lapsed time is determined according to the number of frames that were shot, it is also possible to measure the lapsed time using a timer or the like. The AE control unit 302 advances the processing to step S705 if the lapsed time is longer than or equal to the predetermined time period, and to step S708 if the lapsed time is shorter than the predetermined time period. In the SW1 holding state, the number of "frames" of the moving image is used because a live view image (moving image) is being shot (the same applies to shooting of a moving image for recording), whereas in the SW2 holding state, the number of "frames" of still images that are being continuously shot is used. Ordinarily, if the frame rate when shooting a moving image and the shooting interval when performing continuous shooting differ from each other, the lengths of lapsed time also differ from each other although the number of frames of a moving image and the number of frames of still images are the same. Therefore, it is possible to convert the lapsed time to actual time if needed. In any case, the determination here intends to determine whether or not the template image should be updated on the basis of the lapsed time, and is not limited to a specific method. For convenience, "frame of a moving image" and "frame of still images" are hereinafter collectively referred to as "frame".

In step S705, the AE control unit 302 determines whether or not a degree of reliability of tracking in a predetermined number of frames that are close to each other is the predetermined value at most. If the degree of reliability of tracking in all the predetermined number of the frames that are close to each other is the predetermined value at most, the AE control unit 302 determines that it has lost the tracking target and sets, in step S706, the face tracking start determination flag to "True", and advances the processing to step S708. If there is any frame whose degree of reliability of tracking exceeds the predetermined value, the AE control unit 302 does nothing and advances the processing to step S708.

In step S708, the AE control unit 302 advances the processing to step S709 if the face tracking start determination flag that was set in steps S701, S706, and S707 is "True", and ends the tracking template generation processing if it is "False".

In step S709, the AE control unit 302 determines whether or not, in the face detection processing S405, a face was detected in the current frame and the one frame before in succession. If faces were detected in succession, the AE control unit 302 sets (updates), in step S710, an image in the face detection area of the photometric image as the template image, and ends the tracking template generation processing S406. If no face is detected in any frame, the AE control unit 302 does not set (update) a template image and ends the tracking template generation processing in step S406.

The foregoing is the explanation of the processing performed in the tracking template generation processing of step S406.

With the processing in step S705, the template image is not updated at the location of face detection until a state of a low degree of reliability of tracking continues for a predetermined number of frames, so that it is possible to prevent the tracking target from being changed to another face of a subject, such as a passer-by in the background, other than the main subject. Also, even if the main subject is not detected temporarily because it is hidden behind an obstacle or changes its direction, the template image is kept to be held for the predetermined number of frames, so that it is possible to start again tracking when the main subject can be detected again.

On the other hand, if the state of a low degree of reliability of tracking continues for a predetermined number of frames, the AE control unit 302 determines that it has lost the tracking target and immediately sets, with the operation in step S709, a newly detected face to the template image as a new tracking target, so that it is possible to automatically change the tracking target.

Hereinafter, the relation between results of the subject tracking processing and the operation of the tracking template generation processing of the present embodiment is explained further in detail with reference to FIGS. 1, 6A to 6D, and 8.

Figure 1:
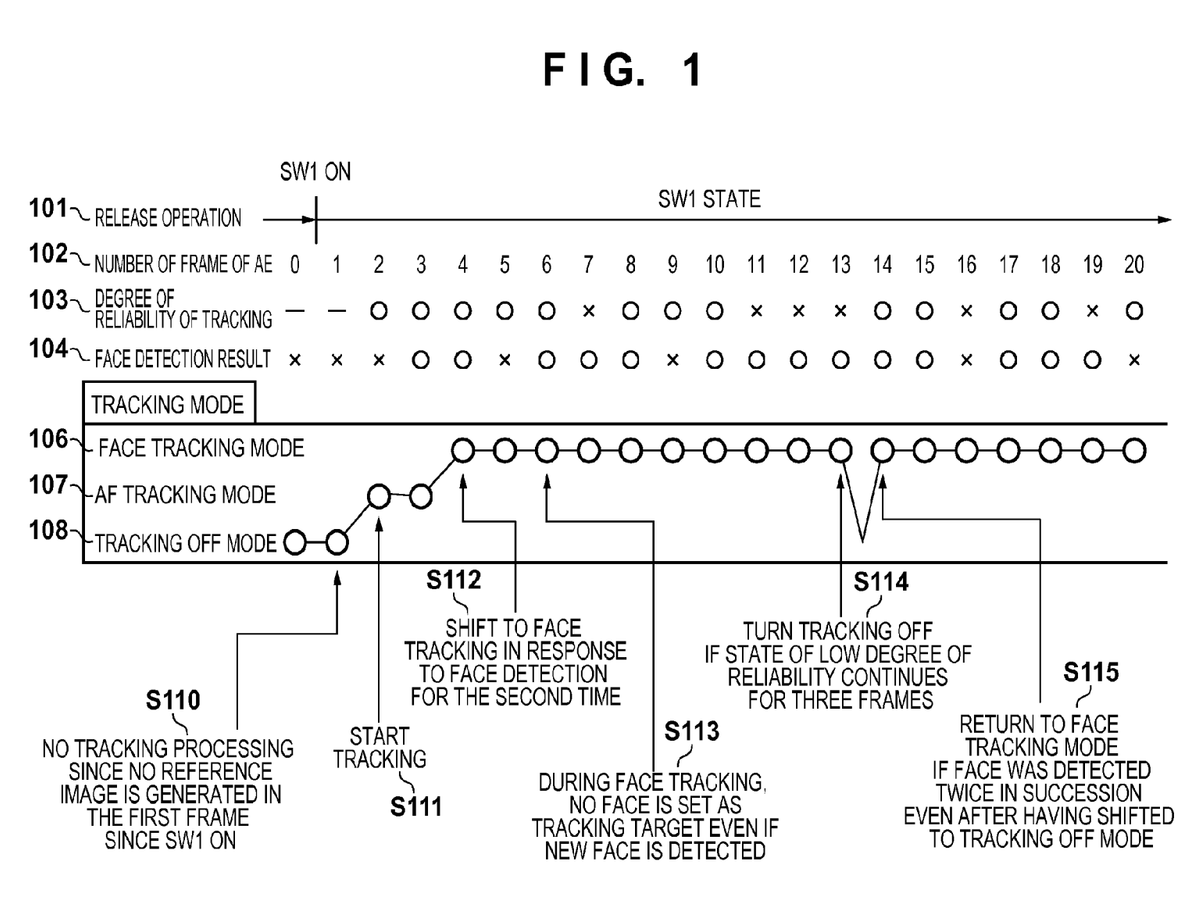
FIG. 1 is a diagram illustrating an example of control of a tracking mode shift based on face detection results and reliability of tracking in an image capture apparatus according to an embodiment of the present invention.

FIG. 1 is diagram illustrating an example of control of tracking mode shift based on face detection results and reliability of tracking, the face detection and the tracking being performed in the SW1 holding state by the AE control unit 302. In the present embodiment, the subject tracking processing and the tracking template generation processing have three tracking modes that depend on a subject as a tracking target. Namely, the three tracking modes are a face tracking mode 106, an AF tracking mode 107, and a tracking OFF mode 108.

The face tracking mode 106 is a mode in which tracking is performed with an image area centered on a area where a face is detected being set as a template image. The AF tracking mode 107 is a mode in which tracking is performed with an image area centered on a focus area selected by the AF being set as a template image. The tracking OFF mode 108 is a mode in which no tracking is performed.

In FIG. 1, a release operation 101 shows a state of the release button. Here, "SW1 ON" denotes a timing at which output of the signal SW1 is detected, the signal SW1 being output by the release button being pushed half way down.

The number of frames of AE 102 shows the number of frames that have elapsed since the AE control unit 302 has first received the AE start signal D02 and started the operation.

Degree of reliability of tracking 103 schematically shows the reliability of the subject tracking results that were calculated in the subject tracking processing in step S403. Here, ○ denotes the case where a degree of reliability is determined to be higher than a predetermined threshold, whereas x denotes the case where a degree of reliability is determined to be lower than the predetermined threshold. A method for calculating the degree of reliability of tracking 103 will be explained later.

The face detection result 104 shows whether or not at least one face was detected in the face detection processing in step S405. Here, ○ denotes the case that at least one face was detected, whereas x denotes the case that no face was detected.

Step S110 to Step S115 show frames that relate to mode shifts for tracking the tracking target.

Step S110 is the first frame since the AE control unit 302 started the operation. At this point of time, the tracking template generation processing has not been yet performed, so that no template image for tracking has been generated. Therefore, the tracking OFF mode 108 is maintained, and no tracking processing is performed.

Step S111 shows the state in the next frame (frame number 2). The subject tracking starts by using a template image that was generated in the tracking template generation processing (S406) from a photometric image generated in a sensor read-out processing (S402) in the FIG. 4 in the first frame. In this frame, no face is detected, so that the mode shifts to the AF tracking mode 107. In this case, the tracking target is a subject that is present at the location of the selected focus area. In this way, it is possible to track any subject even if no face was detected.

An example of an optical finder image in the AF tracking mode using the template image that was generated in the frame of step S110 is schematically illustrated in FIG. 6A. As described above, rectangles illustrated in FIG. 6A are frames (focus area frames) that each show a focus area that can be set, in which the rectangles with dotted lines are not displayed.

A user selected focus area 611 with a thick solid line as illustrated in FIG. 6A is a focus area that is being selected by the user at that time when the release button is pushed half way down. When receiving the AF start signal D01 in FIG. 4, which was output by the release button being pushed half way down, the AF control unit 304 sets the user selected focus area 611 as a selected focus area in the focus area selecting processing (S423) in FIG. 4.

A focus area 612 represented with a solid line that is shown below the user selected focus area 611 shows, among the focus areas located upward, downward, leftward, and rightward the selected focus area, a focus area in which a difference in amounts of defocusing between the focus area and the selected focus area is not greater than a predetermined threshold.

Since focus area frames with solid lines are displayed on the focusing screen 206 illustrated in FIG. 2, the user can view, through the finder, the selected focus area, and surrounding focus areas that each have a little difference in the amount of defocusing between the focus area and the selected focus area. The focus area frames with dotted lines are not displayed on the focusing screen 206.

The tracking template generation processing S406 in FIG. 4 starts tracking from step S111 with the location of the user selected focus area 611 being set as a tracking target.

Step S112 shows the state in the fourth frame. The face detection result 104 sequentially shows ○ in the third and fourth frames, that is, a face is detected twice in succession. In such a case, the AE control unit 302 updates, in the tracking template generation processing (S406) in FIG. 4, the template image to an image that is cut out from the face detection area.

The reason why only a face that was detected twice in succession is set as a tracking target is to reduce the probability of setting a falsely detected area as a tracking target in the case of false detection in the face detection processing (S405) in FIG. 4. Since the detection rate of a real face is higher than in the case where an object is falsely detected as a face, the more often sequential detection is performed, the lower the probability of setting the falsely detected object as a tracking target is. However, if the number of the successive detection required to update the template image are increased, then it will take longer time until a real face is set as a tracking target, and therefore the number of the sequential detection is here experientially set to two.

The area where the face is detected is taken as a new tracking target, so that the mode shifts to the face tracking mode 106.

This makes it possible, if a face is detected in the SW1 holding state and during continuous shooting (in the SW2 holding state), to automatically focus on faces without the need of the user manually re-setting the focus area.

Figure 6B:
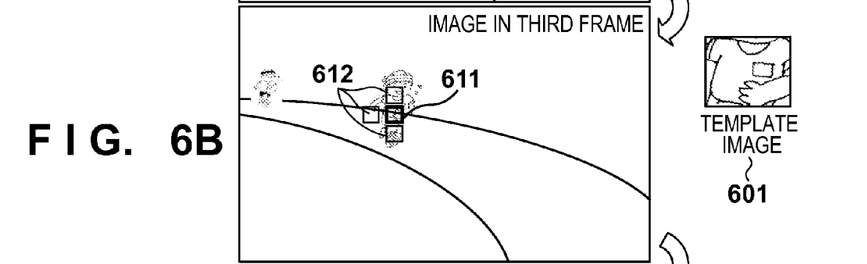
Figure 6C:
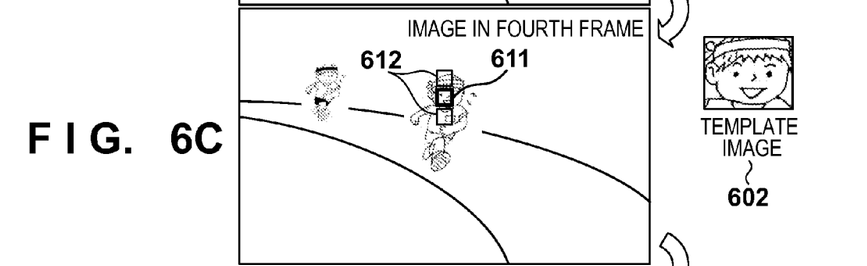

Change of the optical finder image when tracking the target in step S112 is schematically illustrated in FIGS. 6B and 6C. In the example of FIG. 1, since no face is detected up to the second frame, tracking is performed using the template image 601 that was set in step S110 (the first frame) as with in FIG. 6B, and a body unit of the person is kept to be selected as the focus area.

In step S112 in the fourth frame, since the face that was sequentially detected in the third and fourth frames is set as the template image, the face is now tracked using a new template image 602 as in FIG. 6C. Consequently, the focus area shifts to the face, making it possible to shoot an image that is focused on the face.

Step S113 shows the sixth frame, in which ○ is indicated as the face detection result 104, which was x in the fifth frame. However, the detected face is not necessarily of the same person whose face was detected in step S112. If the template image is updated each time a new face is detected, there is a risk that the person set as a tracking target is often changed.

Particularly when face detection is performed in an image that was shot by a photometric sensor, the image obtained by the photometric sensor includes an indication of focus area frames, so that the face of the person who is being tracked cannot be detected during tracking due to the indication of the focus area frames (see FIG. 6D), but only a face of another person, instead of the person of the tracking target, may be detected.

This is because the AE device 208 detects faces on the basis of images in a field of view that is projected or displayed on the focusing screen 206, which is a transmissive type display device (see FIG. 2). That is, since the focus area frames are displayed on the focusing screen 206, which is the transmissive type display device, part of the main subject that is a tracking target may be hidden behind the focus area frames and difficult to be viewed, in the image observed by the AE device 208.

The focus area frames that are displayed on the focusing screen 206 are the selected focus areas in one frame before, and the face that is a tracking target is more likely to be present near the selected focus areas in the one frame before. Therefore, in the face detection processing by the AE device 208, the face that is a tracking target is more likely to be affected by the focus area frames, and the face that is not a tracking target is less likely to be affected by the focus area frames, as compared with the face that is a tracking target. Therefore, if face detection is performed by the AE device 208 that observes a field of view including the indication of focus area frames, a state is likely to be caused where the face of the tracking target cannot be detected during the face tracking because it is hidden behind the indication of the focus area frames, and only another face is detected.

Further, independently from whether or not the selected focus area frame is displayed, there is a possibility of false detection in which part of a person other than his face may be mistaken for a face. If a subject to be tracked is mistaken, another subject differing from the subject intended by the user is continuously focused.

Therefore, in the present embodiment, no template image is updated in the face tracking mode 106. Specifically, the tracking template generation processing (S406) is performed without reference to the results of the face detection processing (S405). This makes it possible to continuously track the face of the person that was first set as a template image.

On the other hand, in order to effectively use the face detection functionality, in the exposure control processing (S404) in step FIG. 4, up to five focus areas that are close to the selected focus area are selected in the detected face and, from the average value thereof, a brightness value (BV value) of the subject for use for deciding a shooting condition is calculated. By deciding a shooting condition on the basis of this BV value, it is possible to set appropriate exposures for a plurality of faces respectively.

Figure 8:
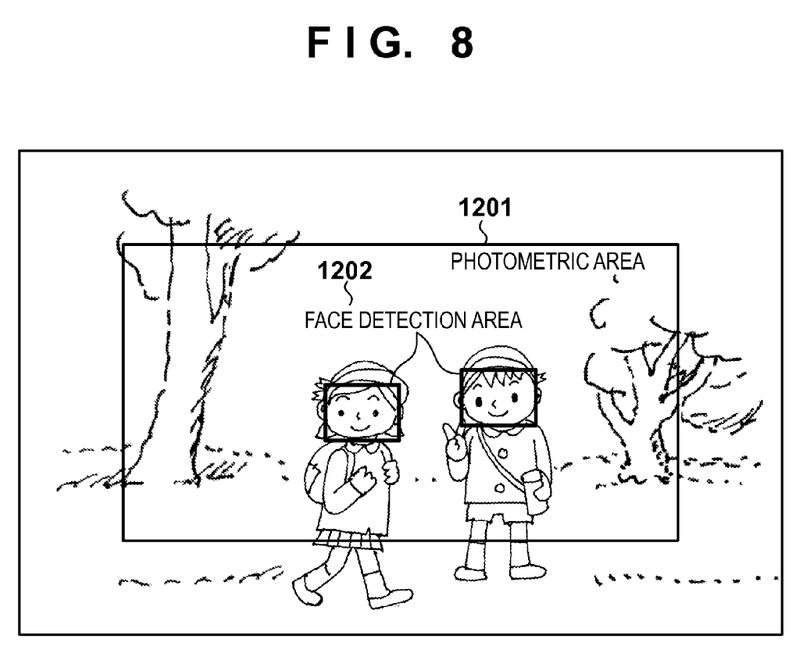
FIG. 8 is a diagram illustrating an example of a relation between a face detection area and a photometric area of the image capture apparatus according to the embodiment of the present invention.

For example, shooting as illustrated in FIG. 8 is considered in which two persons are main subjects, and a background is a scene of a bright sky. In such a scene, if exposure control is performed on the basis of photometric information (a brightness value) in the entire photometric area 1201, a BV value that is reflected by the bright background may be obtained and thus a shooting condition that lacks exposure to the main subjects may be decided. In such a circumstance, by obtaining a BV value on the basis of the face detection area 1202, it is possible to decide a shooting condition in which the faces of the main subjects are shot with the correct exposure. In addition to the configuration in which a shooting condition is decided depending only on the BV value based on the face detection area, a configuration is also possible such that the BV value based on the photometric area 1201 is corrected so as to have a little difference from the BV value based on the face detection area 1202.

Accordingly, since the information on the face area for the exposure control is used, the face detection processing is performed for each frame even when the tracking template generation processing in FIG. 4 is performed without reference to the face detection results.

Figure 6D:
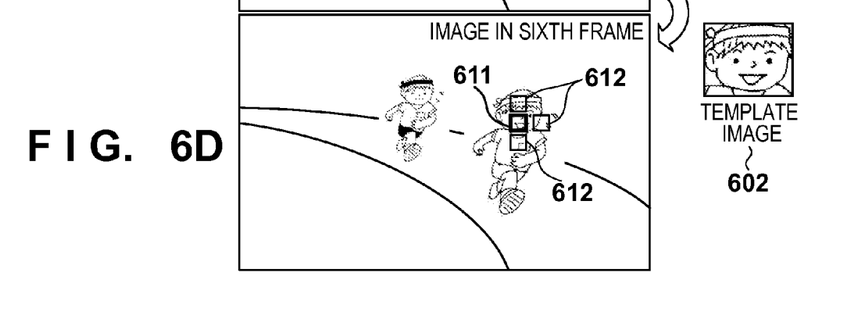

An aspect in which the face detected in step S112 is continuously tracked is shown in FIG. 6D. In step S113, tracking is performed using the template image 602 that was generated in step S112.

Step S114 shows the state in the thirteenth frame. In step S114, degrees of reliability of tracking are low (x) in three successive frames from the eleventh frame. If a state like that in which degrees of reliability of tracking are lower than a predetermined threshold continues for a predetermined number of successive frames (here, three frames), the AE control unit 302 determines that it has lost the tracking target in the subject tracking processing (S403), and shifts the mode to the tracking OFF mode 108. However, if a face was detected in the current frame (the thirteenth frame) and one frame before (the twelfth frame) (twice in succession) as illustrated in FIG. 1, the AE control unit 302 sets the detected face as a new tracking target. Then, the mode again shifts to the face tracking mode 106 (S115).

As described above, when reliability of tracking is low in a predetermined number of successive frames (a plurality of times in succession) and it is determined that the tracking target is lost, if a face is detected in a predetermined number of successive processing frames including the current frame, then the detection target is changed to the currently detected face. Accordingly, without shifting to the tracking OFF mode 108, the face tracking mode substantially continues while the tracking target is changed.

On the other hand, when it is determined that the tracking target is lost and a face was not detected in a predetermined number of successive frames (a plurality of times in succession), even if a face is detected in the current frame, the detected face is not set as a new tracking target. Therefore, a possibility of making a falsely detected person or a person who entered the field of view by accident be set as a tracking target is suppressed, making it possible to perform subject tracking that is robust against factors that may bring the tracking operation into failure, such as false detection of a face or appearance of an unintended person.

While no face is detected and the AE control unit 302 does not perform subject tracking, the AF control unit 304 decides a main subject (a focus area to be selected) according to the results of the focus detection operation and of the focus area selecting processing (S423). When the state of the low degree of reliability of tracking continues for a predetermined number of frames, it is likely that the tracking target intended by the user cannot be tracked correctly. Since this may adversely affect on the focus area re-selection processing (S424) by the AF control unit 304, the AE control unit 302 shifts to the tracking OFF mode so as to temporarily stop the subject tracking processing. In this case, the AE control unit 302 can delete the template image and shift the tracking mode, as with from the first frame or can change, if a face is detected in a predetermined number of successive frames (a plurality of times in succession), the template image to the new face and start the face tracking mode again.

According to the present embodiment, in an image capture apparatus having a subject tracking functionality, if no face is detected, the subject tracking is performed using a template image that was generated on the basis of a focus area that was selected by the automatic focus detection device. It is thus possible to track a subject other than a person. Further, if a face is detected in a predetermined number of successive frames after the state in which no face was detected, subject tracking is performed using a template image that was generated on the basis of the detected face, making it possible, if the same person is detected in succession, to automatically track the person (the face thereof).

Further, during tracking of a person (face), the template image is not changed even if a face is detected as long as it is not determined that reliability of tracking is low in a predetermined number of successive frames. Therefore, if the face that is being tracked was temporarily hidden and then reappeared, it is possible to continue to track the same face, thereby achieving a stable tracking that suppresses a face of the tracking target from being often changed. Further, during tracking of a person (face), when it is determined that reliability of tracking is low in a predetermined number of successive frames, and no face is detected in the predetermined number of successive frames, then the tracking operation is interrupted. It is thus possible to prevent focus adjustment from being performed on an unintended subject sequentially. Further, during tracking of a person (face), when it is determined that reliability of tracking is low in a predetermined number of successive frames, and a face is detected in a predetermined number of successive frames, then the template image is updated on the basis of the detected face. This makes it possible, if the tracking target is lost, to change to tracking of the currently stably detected face automatically and promptly.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089675, filed on Apr. 10, 2012, which is hereby incorporated by reference herein its entirety.

What is claimed is:

1. An image capture apparatus comprising:
   a face detection unit configured to detect a face that is included in an image;
   a subject detecting unit configured to track a subject by sequentially detecting an area similar to a template image of the subject in a sequence of images obtained by shooting; and
   a control unit configured to:
      determine, during tracking of the subject, reliability of the detection by the subject detecting unit, and
      if the face detected by the face detection unit has been set as the template image,
         not change the template image until it is determined a predetermined plurality of times in succession that the reliability of the detection by the subject detecting unit is low, and
         change the template image to another face that has been continuously detected for the predetermined plurality of times in succession if it has been continuously determined for the predetermined plurality of times in succession that the reliability of the detection by the subject detecting unit is low.

2. The image capture apparatus according to claim 1, further comprising
   a focus detection unit configured to detect focus conditions for a plurality of focus areas and to select a focus area to be focused on the basis of the focus conditions,
   wherein the control unit is further configured, when the template image is not set, to set the template image on the basis of the focus area selected by the focus detection unit.

3. The image capture apparatus according to claim 2, wherein the focus detection unit is further configured, when a subject is detected by the subject detecting unit, to select a focus area to be focused on the basis of a location of the detected subject.

4. The image capture apparatus according to claim 2, wherein the face detection unit is further configured to detect the face on the basis of an image having a field of view that is observed through a transmissive type display device for displaying at least the focus area to be focused among the plurality of focus areas.

5. An image capture apparatus comprising:
   a face detection unit configured to detect a face that is included in an image;
   a subject detecting unit configured to track a subject by sequentially detecting an area similar to a template image of the subject in a sequence of images obtained by shooting; and
   a control unit configured to:
      determine, during tracking of the subject, reliability of the detection by the subject detecting unit, and
      if the face detected by the face detection unit has been set as the template image,
         not change the template image until it is determined a predetermined plurality of times in succession that the reliability of the detection by the subject detecting unit is low, and
         temporarily interrupt the tracking of the subject using the template image if no face has been continuously detected for the predetermined plurality of times in succession and if it has been continuously determined for the predetermined plurality of times in succession that the reliability of the detection by the subject detecting unit is low.

6. The image capture apparatus according to claim 5, further comprising a focus detection unit configured to detect focus conditions for a plurality of focus areas and to select a focus area to be focused on the basis of the focus conditions, wherein the control unit is further configured, when the template image is not set, to set the template image on the basis of the focus area selected by the focus detection unit.

7. The image capture apparatus according to claim 6, wherein the focus detection unit is further configured, when a subject is detected by the subject detecting unit, to select a focus area to be focused on the basis of a location of the detected subject.

8. The image capture apparatus according to claim 6, wherein the face detection unit is further configured to detect the face on the basis of an image having a field of view that is observed through a transmissive type display device for displaying at least the focus area to be focused among the plurality of focus areas.

9. A method for controlling an image capture apparatus, wherein the image capture apparatus includes a face detection unit configured to detect a face that is included in an image, and a subject detecting unit configured to track a subject by sequentially detecting an area similar to a template image of the subject in a sequence of images obtained by shooting, the method comprising:

determining, during tracking of the subject, reliability of the detection by the subject detecting unit; and if the face detected by the face detection unit has been set as the template image:

not changing the template image until it is determined a predetermined plurality of times in succession that the reliability of the detection by the subject detecting unit is low, and changing the template image to another face that has been continuously detected for the predetermined plurality of times in succession if it has been continuously determined for the predetermined plurality of times in succession that the reliability of the detection by the subject detecting unit is low.

10. A method for controlling an image capture apparatus, wherein the image capture apparatus includes a face detection unit configured to detect a face that is included in an image, and a subject detecting unit configured to track a subject by sequentially detecting an area similar to a template image of the subject in a sequence of images obtained by shooting, the method comprising:

determining, during tracking of the subject, reliability of the detection by the subject detecting unit; and if the face detected by the face detection unit has been set as the template image:

not changing the template image until it is determined a predetermined plurality of times in succession that the reliability of the detection by the subject detecting unit is low, and temporarily interrupting the tracking of the subject using the template image if no face has been continuously detected for the predetermined plurality of times in succession and if it has been continuously determined for the predetermined plurality of times in succession that the reliability of the detection by the subject detecting unit is low.

* * * * *